(12) United States Patent
Okita

(10) Patent No.: US 10,409,101 B2
(45) Date of Patent: Sep. 10, 2019

(54) LIQUID CRYSTAL DISPLAY DEVICE

(71) Applicant: Japan Display Inc., Tokyo (JP)

(72) Inventor: Mitsutaka Okita, Tokyo (JP)

(73) Assignee: Japan Display Inc., Tokyo (JP)

(*) Notice: Subject to any disclaimer, the term of this patent is extended or adjusted under 35 U.S.C. 154(b) by 170 days.

(21) Appl. No.: 15/292,304

(22) Filed: Oct. 13, 2016

(65) Prior Publication Data

US 2017/0115525 A1    Apr. 27, 2017

(30) Foreign Application Priority Data

Oct. 27, 2015  (JP) .................................. 2015-210779

(51) Int. Cl.
| | | |
|---|---|---|
| *G02F 1/1333* | (2006.01) | |
| *G02F 1/1335* | (2006.01) | |
| *G02F 1/1339* | (2006.01) | |
| *G02F 1/1343* | (2006.01) | |
| *G02F 1/1362* | (2006.01) | |
| *G02F 1/1368* | (2006.01) | |

(52) U.S. Cl.
CPC ...... *G02F 1/133512* (2013.01); *G02F 1/1339* (2013.01); *G02F 1/1368* (2013.01); *G02F 1/13394* (2013.01); *G02F 1/133345* (2013.01); *G02F 1/134309* (2013.01); *G02F 1/136286* (2013.01); *G02F 2201/121* (2013.01); *G02F 2201/123* (2013.01); *G02F 2202/02* (2013.01)

(58) Field of Classification Search
CPC ......... G02F 1/133512; G02F 1/136209; G02F 1/133345; G02F 1/1339; G02F 1/13394; G02F 1/134309; G02F 1/136286; G02F 1/1368; G02F 2201/121; G02F 2201/123; G02F 2202/02

USPC ......................................................... 349/110
See application file for complete search history.

(56) References Cited

U.S. PATENT DOCUMENTS

| | | | | |
|---|---|---|---|---|
| 2014/0009711 A1* | 1/2014 | Tomioka | .......... | G02F 1/134363 349/43 |
| 2014/0176885 A1* | 6/2014 | Okita | ................ | G02F 1/133512 349/106 |

FOREIGN PATENT DOCUMENTS

| | | |
|---|---|---|
| JP | 2014-13300 A | 1/2014 |
| JP | 2014-126674 A | 7/2014 |

\* cited by examiner

*Primary Examiner* — Nathanael R Briggs
*Assistant Examiner* — William Peterson
(74) *Attorney, Agent, or Firm* — Michael Best & Friedrich LLP

(57) ABSTRACT

There is provided a liquid crystal display device that reduces viewing angle color mixture on a high definition screen. In the liquid crystal display device, a pixel electrode is formed on a region surrounded by scanning lines and picture signal lines. The scanning line is insulated from the picture signal line by a first insulating film. An organic insulating film is formed to cover the picture signal line. The organic insulating film is not formed below the pixel electrode. A common electrode is formed to cover the organic insulating film and the first insulating film. A second insulating film is formed to cover the common electrode. The pixel electrode is formed on the second insulating film. On the organic insulating film, a metal light shielding film is formed as extending in a second direction. The metal light shielding film is in contact with the common electrode.

17 Claims, 14 Drawing Sheets

LIQUID CRYSTAL DISPLAY DEVICE

CLAIM OF PRIORITY

The present application claims priority from Japanese Patent Application JP 2015-210779 filed on Oct. 27, 2015, the content of which is hereby incorporated by reference into this application.

BACKGROUND

The present invention relates to a display device, and more specifically to a liquid crystal display device that reduces color mixture between adjacent pixels in the case in which its screen is obliquely viewed.

A liquid crystal display device includes: a TFT substrate, on which pixels each having a pixel electrode, a thin film transistor (TFT), and other components are formed in a matrix configuration; a counter substrate disposed as opposed to the TFT substrate; and a liquid crystal sandwiched between the TFT substrate and the counter substrate. The transmittance of light caused by liquid crystal molecules is controlled for every pixel to form images.

The pixel is formed on a region surrounded by scanning lines and picture signal lines. As the definition of a screen becomes higher, the area of the pixel becomes smaller. As a result, the transmission region of the pixel becomes relatively smaller. In the liquid crystal display device, an organic insulating film is formed thick as a flat film. However, in order to connect the pixel electrode to the TFT, it is necessary to form a through hole on the organic insulating film. This through hole is not allowed to be used as a transmission region for forming a pixel. The diameter of the through hole formed on the organic insulating film is large, causing a reduction in the transmittance of the pixel.

Japanese Unexamined Patent Application Publication No. 2014-13300 describes a configuration aiming to increase the transmission region of a pixel, in which an organic insulating film is left on a picture signal line, the organic insulating film is removed from a portion formed with a pixel electrode or through hole, and thus the diameter of the through hole is decreased.

SUMMARY

In liquid crystal display devices used in smartphones, tablets, and other devices, their resolutions become higher. As a result, the pixel size is downscaled. Liquid crystal display panels at a resolution level of 400 ppi or more are commercially available, and liquid crystal display panels at a resolution level of 600 ppi are also developed. A decrease in the pixel size increases the ratio of the scanning line, the picture signal line, or the light shielding layer to the area of the pixel, causing the aperture ratio to be decreased.

In order to solve this problem, the width of a picture signal line or light shielding layer is narrowed. However, for example, a narrow light shielding layer causes a phenomenon referred to as viewing angle color mixture, in which in the case in which a counter substrate formed with color filters is displaced from a TFT substrate, colors of adjacent pixels look like mixed together when the screen is viewed obliquely. An object of the present invention is to prevent this viewing angle color mixture.

An object of the present invention is to solve the problem. Representative aspects are as follows.

(1) A liquid crystal display device includes: a TFT substrate; a counter substrate attached to the TFT substrate on an outer edge portion with a sealing material; and a liquid crystal sealed between the TFT substrate and the counter substrate. In the liquid crystal display device, on the TFT substrate, scanning lines extend in a first direction and are arrayed in a second direction at a first pitch. A first insulating film is formed to cover the scanning lines. On the first insulating film, picture signal lines extend in the second direction and are arrayed in the first direction at a second pitch. A pixel electrode is formed on a region surrounded by the scanning lines and the picture signal lines. An organic insulating film is formed to cover the picture signal lines, and the organic insulating film is not formed below the pixel electrode. A common electrode is formed to cover the organic insulating film and the first insulating film. A second insulating film is formed to cover the common electrode, and the pixel electrode is formed on the second insulating film. On the organic insulating film, a metal light shielding film is formed as extending in the second direction, and the metal light shielding film is in contact with the common electrode.

(2) A liquid crystal display device includes: a TFT substrate; a counter substrate attached to the TFT substrate on an outer edge portion with a sealing material; and a liquid crystal sealed between the TFT substrate and the counter substrate. In the liquid crystal display device, on the TFT substrate, scanning lines extend in a first direction and are arrayed in a second direction at a first pitch. A first insulating film is formed to cover the scanning lines. On the first insulating film, picture signal lines extend in the second direction and are arrayed in the first direction at a second pitch. A pixel electrode is formed on a region surrounded by the scanning lines and the picture signal lines. An organic insulating film is formed to cover the picture signal lines, and the organic insulating film is not formed below the pixel electrode. The pixel electrode is formed on the first insulating film. A second insulating film is formed to cover the pixel electrode and the organic insulating film. A common electrode is formed on the second insulating film. The common electrode is formed on the pixel electrode and the organic insulating film. On the organic insulating film, a metal light shielding film is formed to extend in the second direction, and the metal light shielding film is in contact with the common electrode.

DETAILED DESCRIPTION

Figure 9:
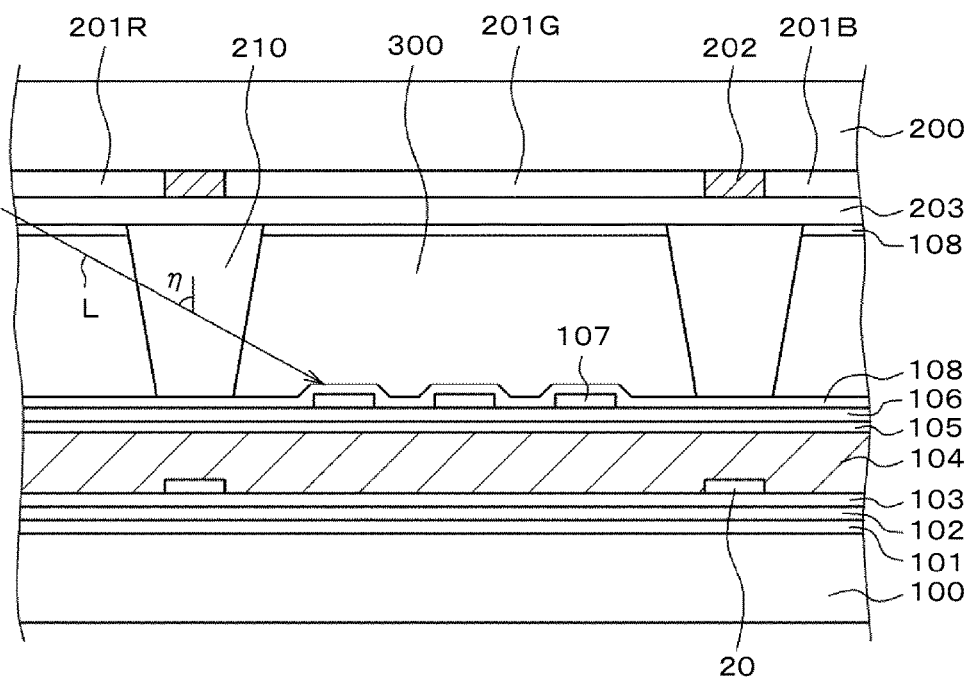
FIG. 9 is a plan view of a pixel portion to which an embodiment of the present invention is not used.

Prior to describing specific embodiments of the present invention, viewing angle color mixture will be described. FIG. 9 is a cross sectional view of a pixel region of a liquid crystal display device by In-plane switching (IPS). The detail of a cross sectional view will be described later. The liquid crystal display device includes: a TFT substrate 100 formed with a pixel electrode 107, a common electrode 105, and other components; a counter substrate 200 formed with a light shielding layer 202, color filters 201R, 201G, and 201B, a columnar spacer 210, and other components; and a liquid crystal layer 300 sandwiched between the TFT substrate 100 and the counter substrate 200.

In FIG. 9, pixels are defined by a light shielding layer 202 or picture signal line 20. A columnar spacer 210 is formed at a portion corresponding to the light shielding layer 202. The columnar spacer 210 is responsible for defining a gap between the TFT substrate 100 and the counter substrate 200. In the pixels, upon applying a picture signal to the pixel electrode 107, electric flux lines from the pixel electrode 107 go to the common electrode 105 through the liquid crystal layer 300. The electric flux lines rotate liquid crystal molecules to define the transmittance of the liquid crystal molecules at every pixel for forming images.

In FIG. 9, on the TFT substrate 100, a base film 101, a gate insulating film 102, and a first insulating film 103 are formed. The picture signal line 20 is formed on the first insulating film 103. An organic insulating film 104 is formed to cover the picture signal line 20. The organic insulating film 104 is formed thick in a thickness of about 2 to 3 μm in order to decrease the capacitance across the picture signal line 20 and the common electrode 105. The common electrode 105 is formed flat on the organic insulating film 104. A second insulating film 106 is formed to cover the common electrode 105. The pixel electrode 107 having a slit is formed on the common electrode 105. An alignment film 108 for initially aligning the liquid crystal layer 300 is formed to cover the pixel electrode 105.

In FIG. 9, arrow L expresses a visual line in the case in which a liquid crystal display panel is viewed from a direction inclined at an angle η from a normal direction. The visual line L is a line that originally visually recognizes a pixel having the color filter 201R. However, in FIG. 9, a pixel having the green color filter 201G is also viewed. This is referred to as viewing angle color mixture. The amount of this color mixture is desirably as small as possible. However, when the definition of a screen becomes higher and the pixel size becomes smaller, the amount of viewing angle color mixture is increased.

An embodiment of the present invention is to achieve a configuration, in which the amount of viewing angle color mixture can be decreased and high image quality display can be implemented even in high definition. In the following, an aspect of the present invention will be described in detail with reference to embodiments.

First Embodiment

Figure 1:
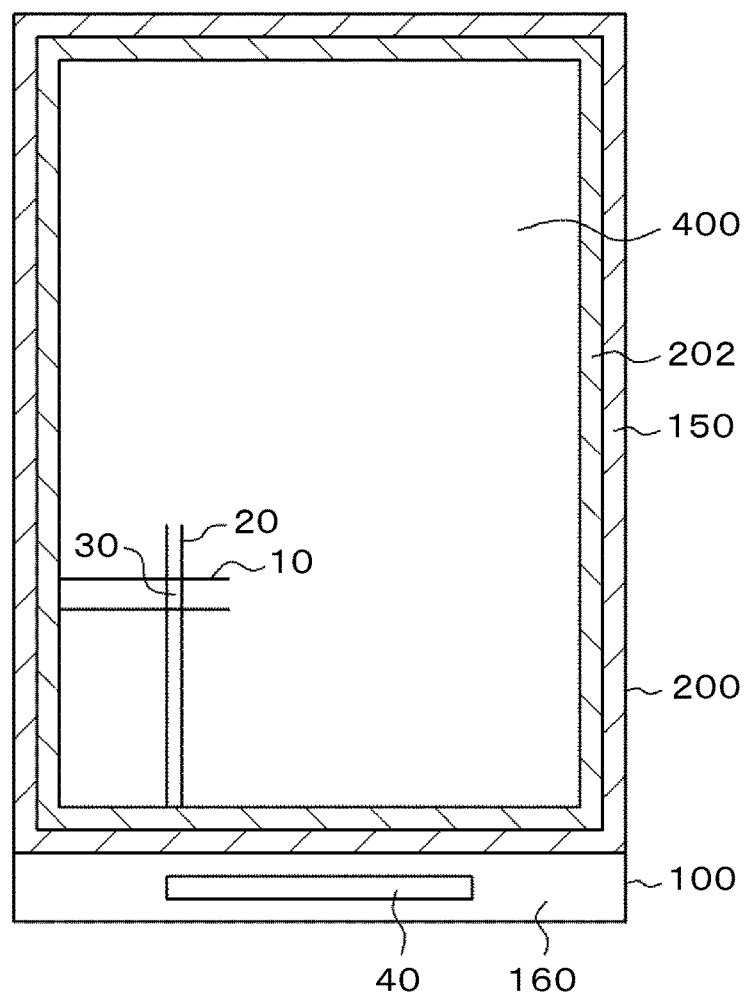
FIG. 1 is a plan view of an exemplary liquid crystal display device to which an embodiment of the present invention is applied.

FIG. 1 is a plan view of a liquid crystal display panel for use in a mobile telephone and other devices as an example, to which an embodiment of the present invention is applied. In FIG. 1, a TFT substrate 100 is attached to a counter substrate 200 on the outer edge portions of the substrates 100 and 200 with a sealing material 150. A liquid crystal is sandwiched between the TFT substrate 100 and the counter substrate 200. The TFT substrate 100 is formed greater than the counter substrate 200. A terminal portion 160 is formed on a portion where only the TFT substrate 100 is provided. On the terminal portion 160, a driver IC 40 is disposed. To the terminal portion 160, a flexible circuit board is connected to externally supply power and signals to the liquid crystal display panel.

In FIG. 1, on a display region 400, scanning lines 10 extend in the lateral direction, and are arrayed at a first pitch in the vertical direction. Picture signal lines 20 extend in the vertical direction, and are arrayed at a second pitch in the lateral direction. A region surrounded by the scanning lines 10 and the picture signal lines 20 is a pixel 30. A region around the display region 400 is a picture frame region. On this region, a light shielding layer 202 as a light shielding film is formed.

Figure 2:
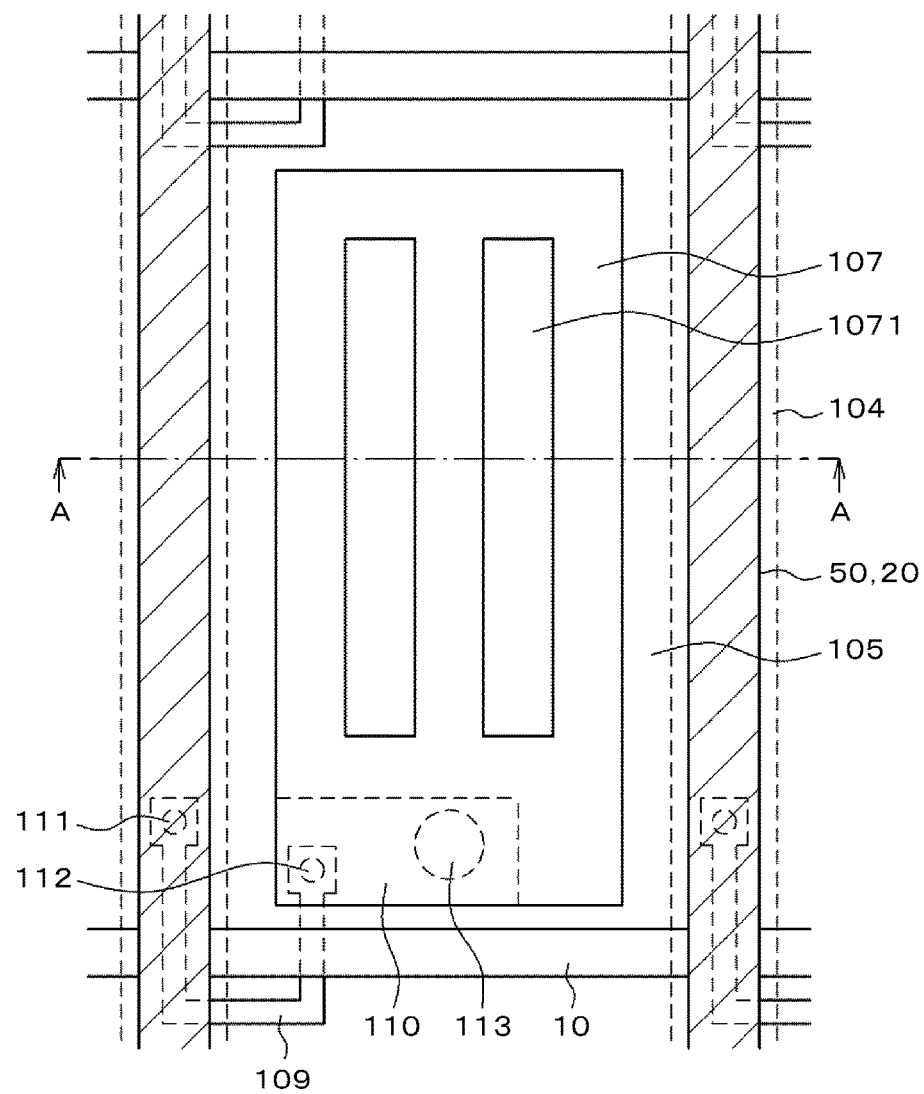
FIG. 2 is a plan view of a pixel portion according to a first embodiment.

FIG. 2 is a plan view of the configuration of the pixel on the display region. In FIG. 2, the scanning lines 10 extend in the lateral direction. The picture signal lines 20 extend in the vertical direction. A pixel electrode 107 made of Indium Tin Oxide (ITO) is formed on the region surrounded by the scanning lines 10 and the picture signal lines 20. Below the pixel electrode 107, a common electrode 105 made of ITO is formed flat entirely on the pixel region through a second insulating film 106. Upon applying a voltage to the pixel electrode 107, electric flux lines are generated through the liquid crystal layer 300 and a pixel electrode slit 1071. This electric field rotates liquid crystal molecules to control the transmittance of the liquid crystal molecules. In FIG. 2, the pixel 30 is defined by the picture signal lines 20 in the lateral direction.

In FIG. 2, below the picture signal line 20, a semiconductor layer 109 extends as sandwiching an insulating layer. The semiconductor layer 109 is connected to the picture signal line 20 through a through hole 111. The semiconductor layer 109 is passed below the scanning line 10 to form a TFT. In other words, the scanning line 10 functions as a gate electrode. The semiconductor layer 109 is bent and again passed below the scanning line 10, and then extends into the pixel. At this time, a TFT is again formed. In other words, FIG. 2 shows a so-called double gate structure, in which two TFTs are formed. Through a through hole 112, the semiconductor layer 109 is connected to a contact electrode 110 formed on the same layer on which the picture signal line 20 is provided. The contact electrode 110 is connected to the pixel electrode 107 through a through hole 113.

In FIG. 2, an organic insulating film 104 is formed in a wall shape to cover the picture signal line 20. The organic insulating film 104 is removed from the region on which the pixel electrode 107 is formed. The common electrode 105 also covers the organic insulating film 104 formed in a wall shape. On the common electrode 105 on the organic insulating film 104, a common electrode light shielding film 50 is formed, which is made of a metal or alloy in the same width as the width of the picture signal line 20. In the following, a metal also includes alloys unless otherwise specified.

The common electrode light shielding film 50 can reduce viewing angle color mixture when the liquid crystal display panel is viewed from the oblique direction. The common electrode 105 is formed entirely on the screen. However, the common electrode light shielding film 50 can reduce a voltage drop in the common electrode 105. The organic insulating film 104 is removed from a portion on which the through hole 113 is formed, allowing the area of the through hole 113 to be decreased. Thus, the transmittance of the pixel can be improved.

Figure 3:
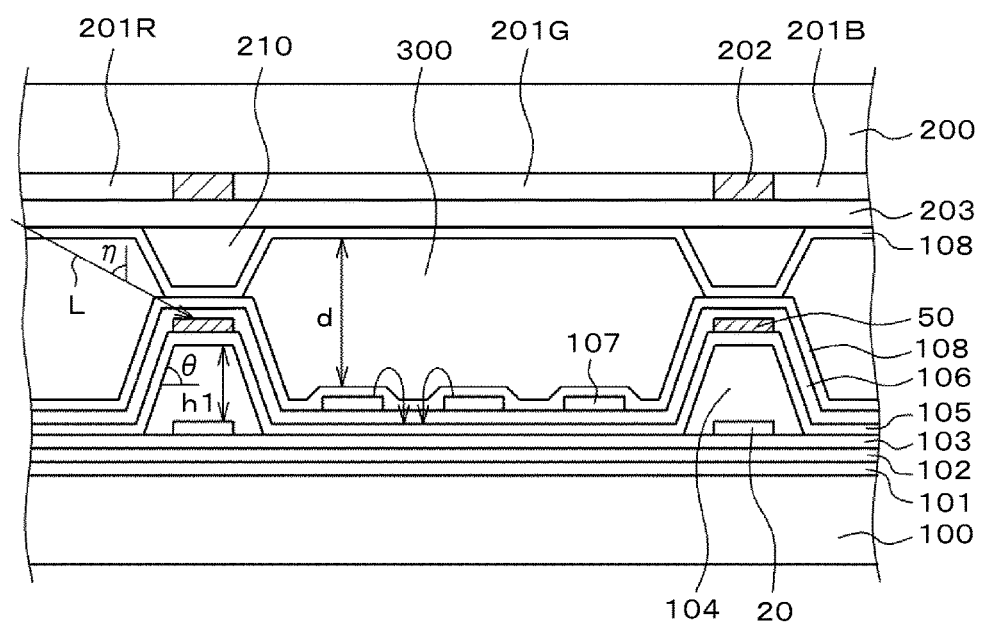
FIG. 3 is a cross sectional view taken along line A-A in FIG. 2.

FIG. 3 is a cross sectional view taken along line A-A in FIG. 2. In FIG. 3, a base film 101 is formed on the TFT substrate 100. The base film 101 prevents the semiconductor layer 109 from being contaminated with impurities from the TFT substrate 100 made of glass. The base film 101 is sometimes made of SiN or SiO2. Alternatively, the base film 101 is sometimes formed of two layers, an SiN film and an SiO2 film. On the base film 101, a gate insulating film 102 is formed. The gate insulating film 102 is a film that insulates the semiconductor layer 109 from the scanning line 20 in FIG. 2 for forming a TFT.

In FIG. 3, on the gate insulating film 102, a first insulating film 103 is formed. The first insulating film 103 is a film that insulates the scanning line 10 from the picture signal line 20. On the first insulating film 103, the picture signal line 20 is formed to form the boundary between the pixels 30. The organic insulating film 104 is formed to cover the picture signal line 20. The organic insulating film 104 is formed thick in a thickness of about 2 to 3 μm to cover the first insulating film 103 and the picture signal line 20. The organic insulating film 104 is then left only on the picture signal line 20, and other portions of the organic insulating film 104 are removed by photolithography. The organic insulating film 104 is formed of a photosensitive resin, allowing the organic insulating film 104 to be patterned with no use of any resist.

In FIG. 3, the common electrode 105 is formed to cover the organic insulating film 104 and the first insulating film 103. The common electrode 105 is formed entirely on the display region. On the organic insulating film 104 covering the picture signal line 20, the common electrode light shielding film 50 is formed on the common electrode 105. The common electrode light shielding film 50 is made of a metal, and thus has a light shielding effect.

In FIG. 3, arrow L expresses a visual line crossing the normal direction of the liquid crystal display panel at an angle η the same as arrow L in FIG. 9. In FIG. 9, the visual line L causes color mixture. However, in FIG. 3, the visual line L is shielded by the common electrode light shielding film 50, and the inside of the green pixel is not allowed to be viewed. Consequently, viewing angle color mixture can be prevented. In other words, viewing angle color mixture can be reduced using the common electrode light shielding film 50.

In FIG. 3, the common electrode light shielding film 50 is made of a metal. Thus, a voltage drop in the common electrode 105 can be prevented. The common electrode 105 is made of ITO, whose resistivity is higher than the resistivity of a metal. In order to reduce optical absorption caused by ITO, the common electrode 105 is formed as thin as 100 nm or less in thickness, for example. Accordingly, although the common electrode 105 is prone to cause a voltage drop, a voltage drop in the common electrode 105 can be reduced using the common electrode light shielding film 50.

The common electrode light shielding film 50 is made of a metal. In order to prevent a voltage drop in the common electrode 105, the common electrode light shielding film 50 desirably has a low resistivity. The common electrode light shielding film 50 can be configured in a film stack similarly to the picture signal line 20, in a three-layer structure including Mo (a bottom layer), Al, and Mo (a cap layer), for example. In this case, the thickness of Mo, which is a bottom layer, is about 10 nm, the thickness of Al is about 200 nm, and the thickness of Mo, which is a cap layer, is about 10 nm. Note that, Al and Mo mean that Al alloys and Mo alloys are also included.

A large capacitance across the picture signal line 20 and the common electrode 105 causes the write speed of picture signals to be slowed. However, the organic insulating film 104 is formed on the picture signal line 20. Thus, an increase in the capacitance across the picture signal line 20 and the common electrode 105 can be prevented. On the other hand, the organic insulating film 104 is removed from the portions other than the portion where the organic insulating film 104 covers the picture signal line 20, allowing a decrease in the diameter of the through hole 113 connecting the contact electrode 110, which is connected to the TFT, to the pixel electrode 107. Accordingly, the transmittance of the pixel can be improved.

In FIG. 3, the second insulating film 106 is formed to cover the common electrode 105. The pixel electrode 107 having the slit 1071 is formed on the second insulating film 106. Upon supplying a picture signal to the pixel electrode 107, electric flux lines depicted by arrows passed through the liquid crystal layer 300 and the slit 1071 are generated to rotate liquid crystal molecules, controlling the transmittance of the pixel 30. The insulating film 106 that insulates the pixel electrode 107 from the common electrode 105 forms the pixel capacitance across the pixel electrode 107 and the common electrode 105. An alignment film 108 is formed to cover the pixel electrode 107.

In FIG. 3, the counter substrate 200 is disposed as sandwiching the liquid crystal layer 300 with the TFT substrate 100. On the counter substrate 200, color filters 201R, 201G, and 201B are formed individually on the pixels 30. The light shielding layer 202 is formed between the color filters 201R, 201G, and 201B. The light shielding layer 202 improves the contrast of the screen as well as defines the pixels 30. An overcoat film 203 is formed to cover the light shielding layer 202 and the color filters 201R, 201G, and 201B.

On the overcoat film 203, a columnar spacer 210 is formed to define the gap between the TFT substrate 100 and the counter substrate 200. A layer thickness d of the liquid crystal layer 300 is about 3 μm. In FIG. 3, the organic insulating film 104 is present on the portion, to which the columnar spacer 210 is faced. Thus, the height of the columnar spacer 210 in FIG. 3 is lower than the height of the columnar spacer 210 in FIG. 9. In other words, also in FIG. 9, the organic insulating film 104 is present on the portion, to which the columnar spacer 210 is faced. However, in FIG. 9, the organic insulating film 104 is also present on the portion where the pixel electrode 107 is present. Thus, in order to maintain the layer thickness d, the height of the columnar spacer 210 in FIG. 9 is higher than the height of the columnar spacer 210 in FIG. 3.

In FIG. 3, under the condition in which the layer thickness d of the liquid crystal layer 300 is set to 3 μm, when the thickness of the organic insulating film 104 is set to 2 μm, the height of the columnar spacer 210 only has to be about 1 μm. When the thickness of the organic insulating film 104 is 3 μm or more, the gap between the TFT substrate 100 and the counter substrate 200 can be defined only using the organic insulating film 104, without forming the columnar spacer 210 on the counter substrate 200 side.

As described above, when the organic insulating film 104 is formed in a wall shape to cover the picture signal line 20 and the common electrode light shielding film 50 is formed above the organic insulating film 104, this common electrode light shielding film 50 functions as the light shielding layer 202, which is conventionally formed on the counter substrate. This means that it is sometimes unnecessary to form the light shielding layer 202 on the counter substrate 200.

In FIG. 3, the width of the common electrode light shielding film 50 is the same as the width of the picture signal line 20 and the width of the light shielding layer 202, and the width is 4 μm, for example. In order to increase the transmittance of the pixel 30, the width of the light shielding layer 202 and the width of the picture signal line 20 are provided at the minimum. Thus, the width of the common electrode light shielding film 50 is provided to their width. However, because of the balance between color mixture and the transmittance, the width of the common electrode light shielding film 50 may be provided differently from the width of the light shielding layer 202 or the width of the picture signal line 20.

In FIG. 3, the common electrode light shielding film 50 is formed on the common electrode 105. However, forming the common electrode light shielding film 50 between the common electrode 105 and the organic insulating film 104 can also achieve similar effects. Also in this case, the common electrode light shielding film 50 can be a film stack. Also in the configuration, the common electrode light shielding film 50 may be configured in a three-layer structure similarly to the picture signal line 20.

In FIG. 3, the organic insulating film 104 is formed in a wall shape, and thus has side walls. When the side wall is gently continued long and formed below the pixel electrode 107, the layer thickness of the liquid crystal layer 300 is changed at the portion where the pixel electrode 107 is provided. When the layer thickness of the liquid crystal layer 300 is changed, the transmittance of the pixel 30 is changed, affecting the reproducibility of images.

In order to prevent such a phenomenon, the side walls of the organic insulating film 104 are preferably steep so as not to overlap the pixel electrode 107. In the embodiment of the present invention, an angle θ of the side wall of the organic insulating film 104 is set to an angle of 60° or more, preventing the influence of the organic insulating film 104 on the thickness of the liquid crystal layer 300 at the pixel electrode 107. As illustrated in FIG. 3, in the case in which the height of the organic insulating film 104 is defined as h1, the angle of the side wall of the organic insulating film 104 is measured at a position h1/2. Note that, as illustrated in FIG. 3, h1 means the height from the upper side of the picture signal line 20 to the top of the organic insulating film 104.

As described above, according to the embodiment, the organic insulating film 104 is formed only on the portion where the organic insulating film 104 covers the picture signal line 20, and the common electrode light shielding film 50 is formed above the organic insulating film 104. Thus, viewing angle color mixture can be reduced. At the same time, a voltage drop in the common electrode 105 can be reduced, allowing uniform images to be formed. Moreover, the diameter of the through hole 113 connecting the pixel electrode 107 to the contact electrode 110 can be decreased. Accordingly, the transmittance of the pixel can be improved.

Figure 4:
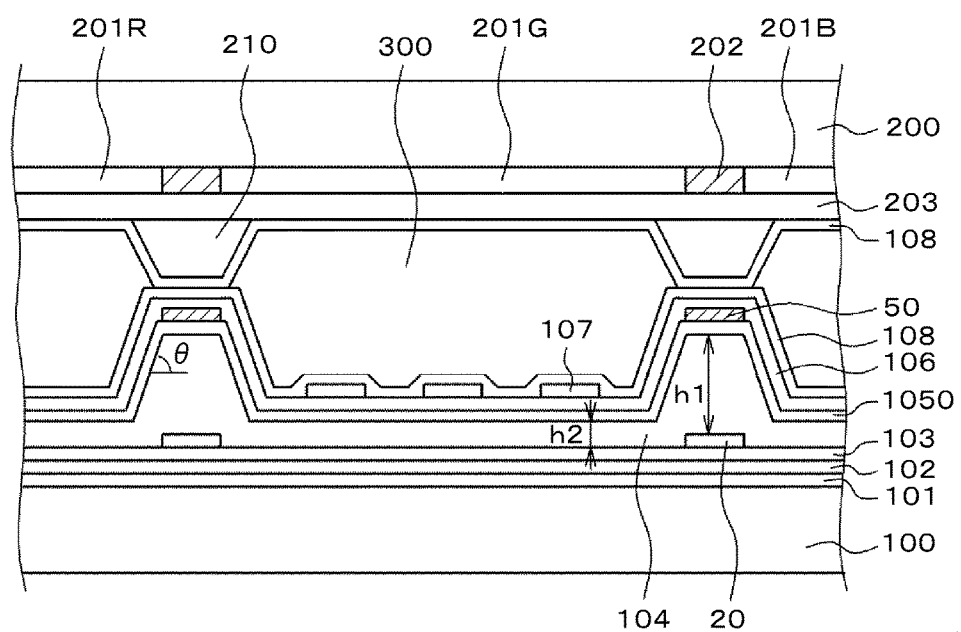
FIG. 4 is a cross sectional view of a pixel portion in another example of the first embodiment.

FIG. 4 is a cross sectional view of another form of the first embodiment. FIG. 4 is different from in FIG. 3 in that the organic insulating film 104 is not fully removed from the pixel region and the organic insulating film 104 is left in a predetermined thickness. This is because the organic insulating film 104 functioning as a protective film or flat film is sometimes desired to be left also on the region on which the pixel electrode 107 is formed.

In FIG. 4, in the case in which the thickness of the organic insulating film 104 on the picture signal line 20 is defined as h1 and the thickness of the organic insulating film 104 at the portion, at which the pixel electrode 107 is formed, is defined as h2, the ratio of h2 to h1 ranges from about ¼ to ½, for example. In other words, when h2 is too large, the effect of the embodiment of the present invention is decreased, whereas when h2 is too small, the effect, in which the organic insulating film 104 is left on the region on which the pixel electrode 107 is formed, is decreased. Note that, the angle θ of the side wall of the organic insulating film 104 only has to be measured at a location (h1−h2)/2 from the base portion of the side wall of the organic insulating film 104.

Second Embodiment

Figure 5:
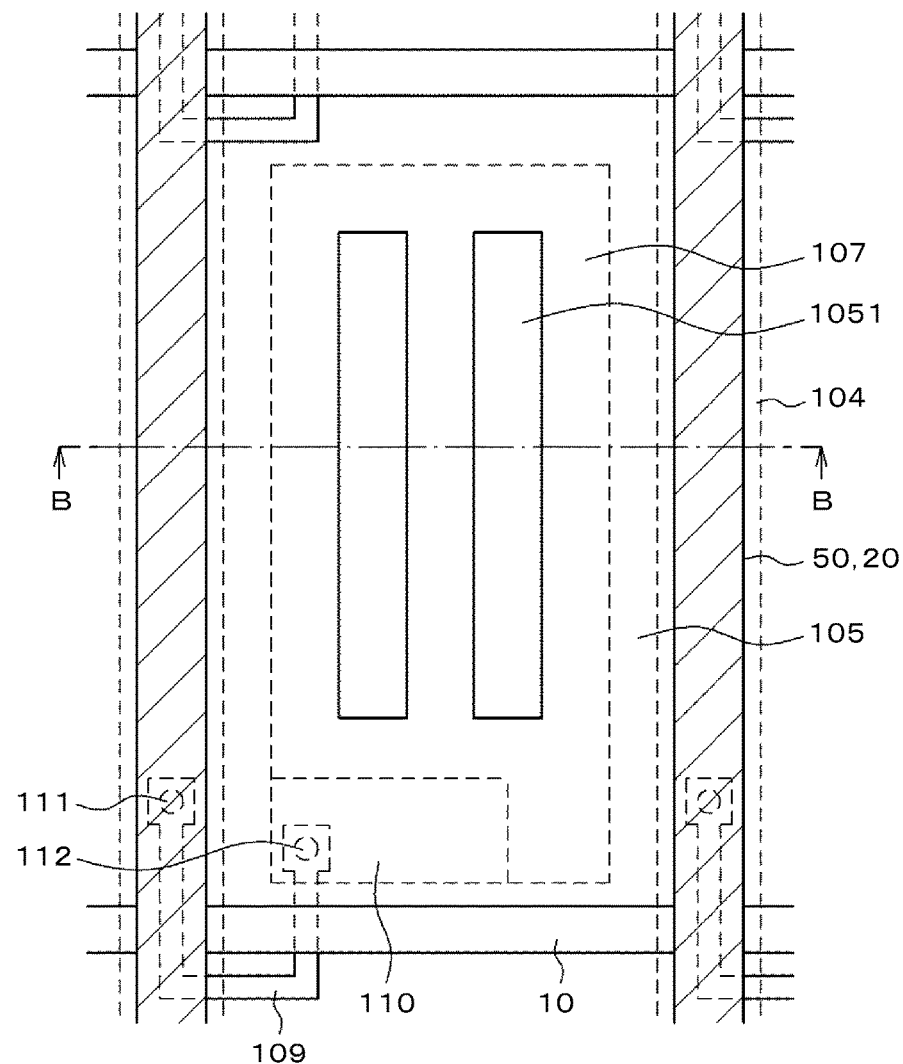
FIG. 5 is a plan view of a pixel portion according to a second embodiment.

FIG. 5 is a plan view of a pixel portion according to a second embodiment of the present invention. In the configuration of the first embodiment, the pixel electrode 107 having the slit 1071 is formed on the common electrode 105, which is formed flat, through the second insulating film 106. In the second embodiment, on a pixel electrode 107 formed flat on every pixel 30, a common electrode 105 having a slit 1051 is formed through a second insulating film 106.

In FIG. 5, the pixel electrode 107 is formed in a rectangle depicted by a dotted line. On the pixel electrode 107, the common electrode 105 having the slit 1051 is formed through the second insulating film 106. The common electrode 105 is formed as shared by the pixels 30. The common electrode slit 1051 is formed only at the portion, at which the common electrode slit 1051 is faced to the pixel electrode 107. The pixel electrode 107 is directly in contact with a contact electrode 110, and no through hole is needed.

Similarly to FIG. 2, in FIG. 5, an organic insulating film 104 is formed only on the portion where the organic insulating film 104 covers a picture signal line 20, and a common electrode light shielding film 50 is formed on the common electrode 105 formed on the organic insulating film 104. In a planer view, the picture signal line 20 and the common electrode light shielding film 50 overlap with each other.

Figure 6:
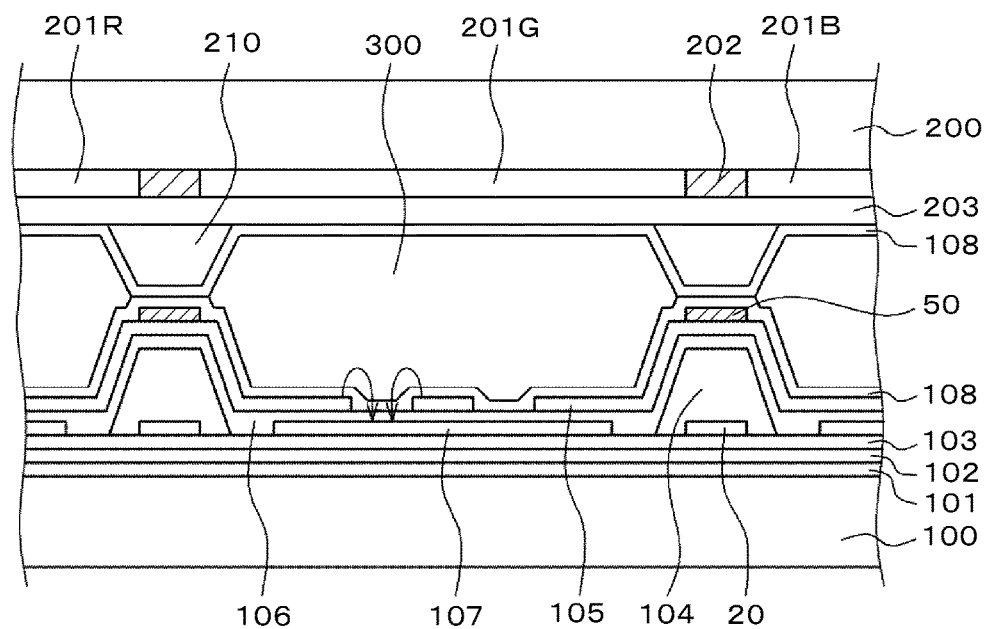
FIG. 6 is a cross sectional view taken along line B-B in FIG. 5.

FIG. 6 is a cross sectional view taken along line B-B in FIG. 5. FIG. 6 is different from FIG. 3 in that in the pixel region, the pixel electrode 107 is formed flat on a first insulating film 103. The organic insulating film 104 is formed to cover the picture signal line 20. The second insulating film 106 is formed on the organic insulating film 104. The common electrode 105 is formed on the second insulating film 106 as shared by the pixels 30. On the pixel electrode 107, the common electrode slit 1051 is formed. Similarly to FIG. 3, upon applying a voltage to the pixel electrode 107, electric flux lines as depicted by arrows are generated to rotate liquid crystal molecules.

In FIG. 6, the common electrode light shielding film 50 is formed on the common electrode 105 on the organic insulating film 104. Similarly as described with reference to FIG. 3, this common electrode light shielding film 50 shields light incident from the oblique direction to reduce viewing angle color mixture. Similarly to the first embodiment, also in the embodiment, a voltage drop in the common electrode 105 can be reduced using the common electrode light shielding film 50, and a uniform screen can be achieved. In FIG. 6, above the organic insulating film 104, the common electrode light shielding film 50 is formed on the common electrode 105. However, the common electrode light shielding film 50 may be formed below the common electrode 105, i.e. formed between the common electrode 105 and the second insulating film 106. Note that, the location, at which the angle of the side wall of the organic insulating film 104 is measured, is the same as the location described in the first embodiment.

Figure 7:
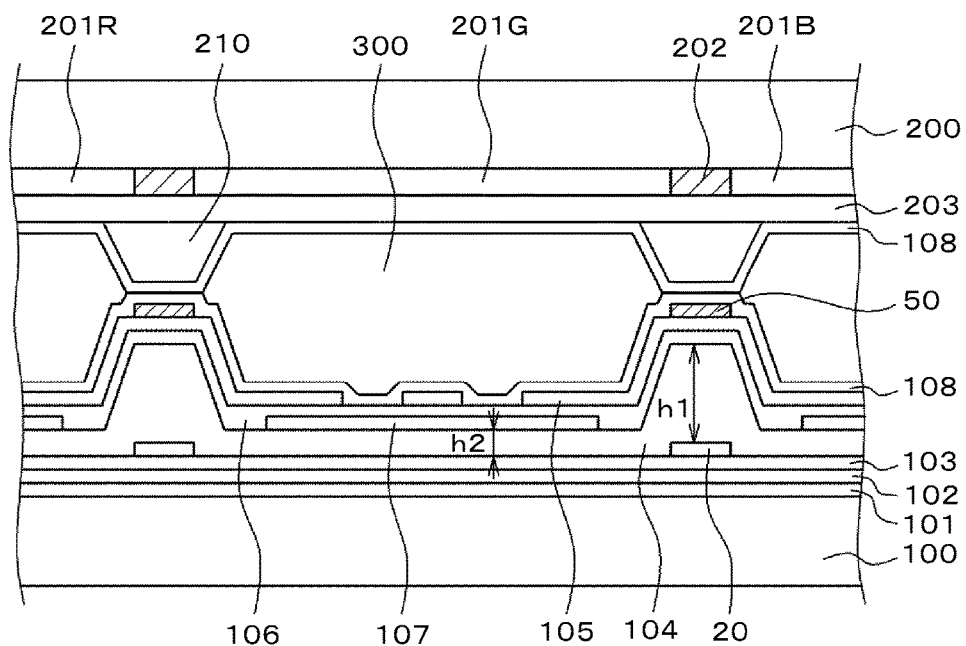
FIG. 7 is a cross sectional view of a pixel portion in another example of the second embodiment.

FIG. 7 is a cross sectional view of another form of the embodiment. This is an example, in which the organic insulating film 104 is left in a predetermined film thickness, instead that the organic insulating film 104 is fully removed from the region on which the pixel electrode 107 is formed. Also in the configuration of the embodiment, this is because the organic insulating film 104 functioning as a protective film or flat film is sometimes desired to be left also on the region on which the pixel electrode 1071 is formed.

A plan view corresponding to FIG. 7 is FIG. 5. However, in the configuration in FIG. 7, the organic insulating film 104 is left on the pixel region. Thus, a through hole 113 for connecting the contact electrode 110 to the pixel electrode 107 is necessary. However, the diameter of the through hole 113 in this case can be made smaller than a previously existing through hole accordingly, because the film thickness of the organic insulating film 104 is small. To the film thickness of the organic insulating film 104 and other parameters in the embodiment, ones described with reference to FIG. 4 can be applied, omitting the description.

In FIG. 7, the thickness of the organic insulating film 104 on the picture signal line 20 is defined as h1, and the thickness of the organic insulating film 104 at the portion at which the pixel electrode is formed, is defined as h2. The ratio of h1 to h2 ranges from about ¼ to ½, for example. In other words, when h2 is too large, the effect of the embodiment of the present invention is decreased, whereas when h2 is too small, the effect, in which the organic insulating film 104 is left on the region on which the pixel electrode 107 is formed, is decreased. Note that, also in this case, the location, at which the angle of the side wall of the organic insulating film 104 is measured, is the same as the location described in the first embodiment.

Third Embodiment

Figure 8:
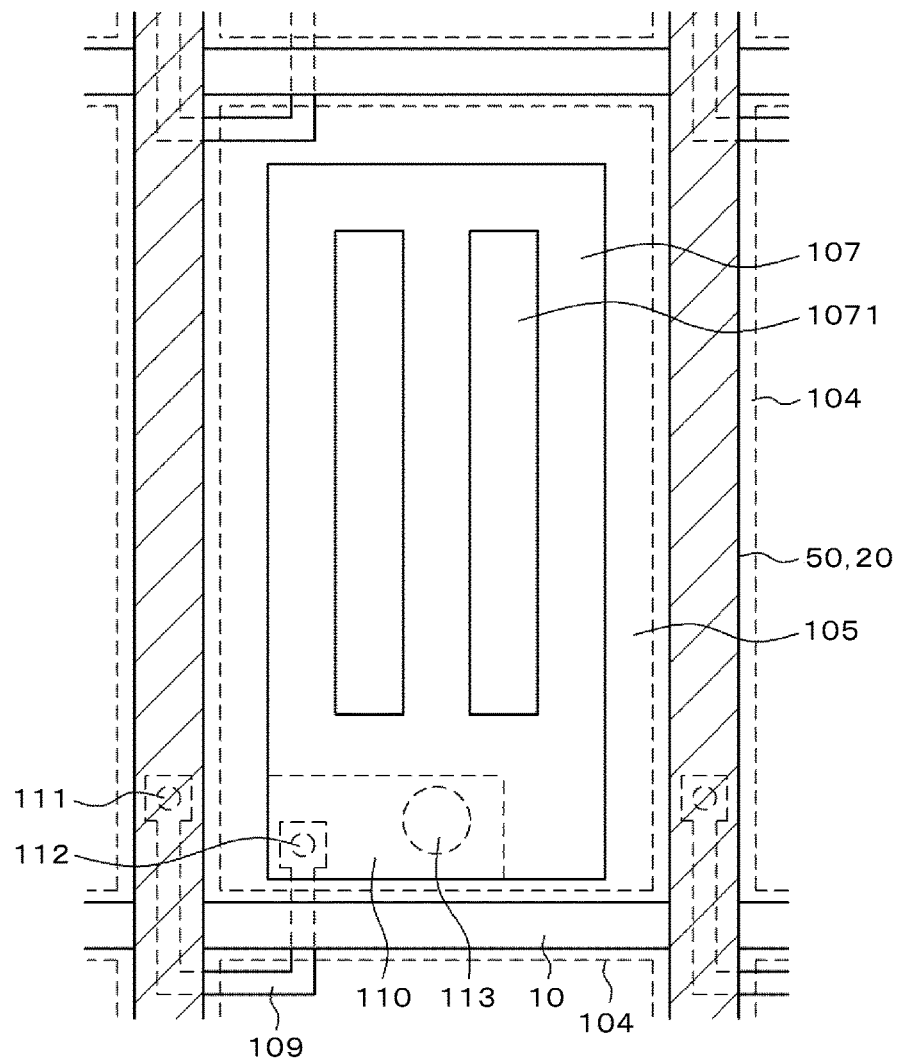
FIG. 8 is a plan view of a pixel portion according to a third embodiment.

FIG. 8 is a plan view of a third embodiment of the present invention. The third embodiment is different from the first and the second embodiments in that an organic insulating film 104 is also left on a scanning line 10. In other words, FIG. 8 is different from FIG. 3 of the first embodiment in that the organic insulating film 104 is also formed on the scanning line 10. No organic insulating film 104 is formed on the region on which a pixel electrode 107 is formed. Note that, the location, at which the angle of the side wall of the organic insulating film 104 is measured on the scanning line 10, is the same as the location, at which the angle of the side wall of the organic insulating film 104 on the picture signal line 10 is measured, in the first embodiment.

In FIG. 8, on the scanning line 10, no common electrode light shielding film 50 is formed. In the vertical direction in FIG. 8, i.e. in the direction in which the picture signal line 20 extends, the color filter in the same color is formed. Thus, a problem of viewing angle color mixture does not occur. However, forming the common electrode light shielding film 50 also on the scanning line 10 provides an advantage that can reduce a voltage drop in the common electrode 105. In other words, the scanning line 10 is a light shielding film. Thus, even forming the common electrode light shielding film 50 on the scanning line 10 does not drop the transmittance.

FIG. 8 is an example corresponding to the first embodiment in which the pixel electrode 107 having the slit 1071 is formed on the flat common electrode 105. The embodiment is also applicable to the configuration corresponding to the second embodiment in which the common electrode 105 having the slit 1051 is formed on the pixel electrode 107 formed flat. The embodiment is also applicable to a liquid crystal display device in which the organic insulating film 104 is left in a film thickness smaller than the film thickness of the organic insulating film 104 on the picture signal line 20, instead that the organic insulating film 104 is fully removed from the pixel region.

Fourth Embodiment

A fourth embodiment has a structure similar to the structure of the first embodiment. However, in the configuration of the fourth embodiment, the luminance of the screen can be improved more than that in the configuration of the first embodiment. In other words, the fourth embodiment is different from the first embodiment in that in the fourth embodiment, a common electrode light shielding film 50 is formed on the upper part as well as the side surfaces of an organic insulating film 104 formed in a wall shape to cover a picture signal line 20. The common electrode light shielding film 50 is made of a metal, and thus has a large reflectance. Consequently, light can be reflected from the side surfaces of the wall to the front surface side of the display, allowing the use efficiency of light to be enhanced. Accordingly, the luminance of the screen can be improved. Similarly to the description of the first embodiment, also in this case, color mixture between adjacent pixels can be prevented.

Figure 10:
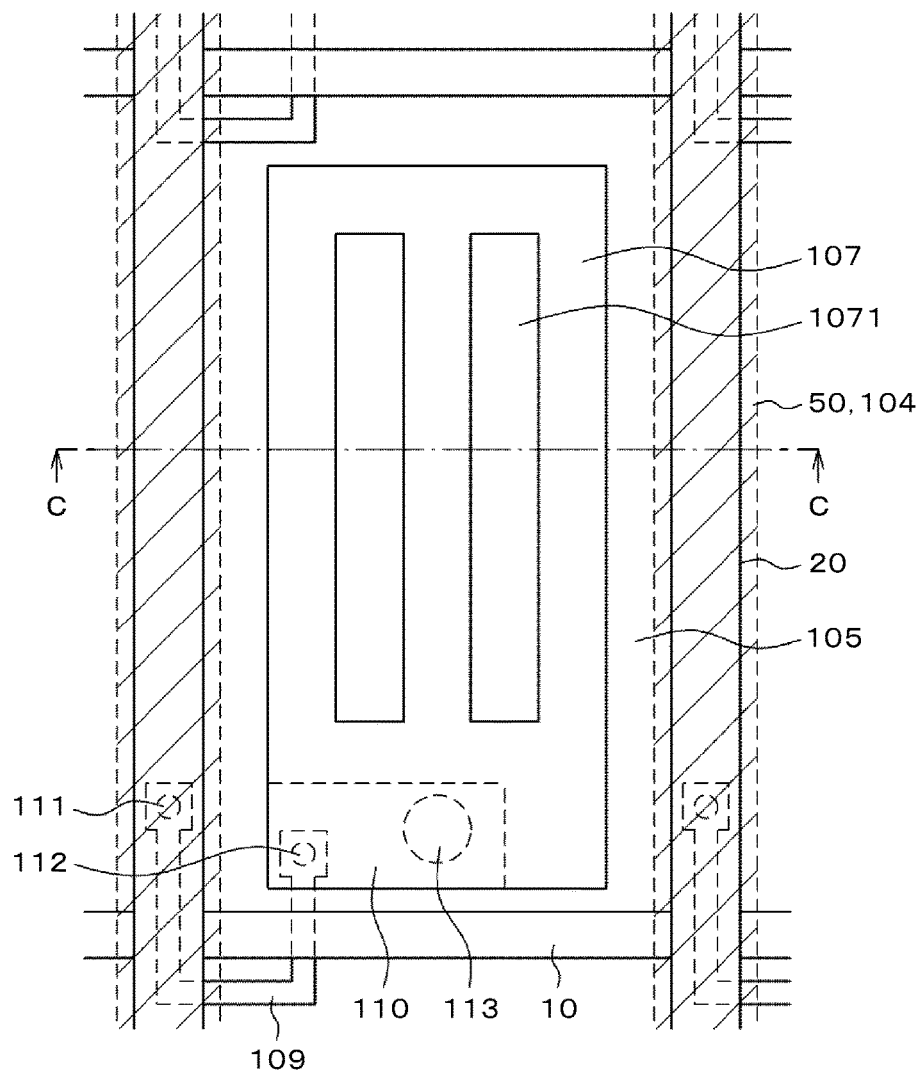
FIG. 10 is a plan view of a pixel portion according to a fourth embodiment.
Figure 11:
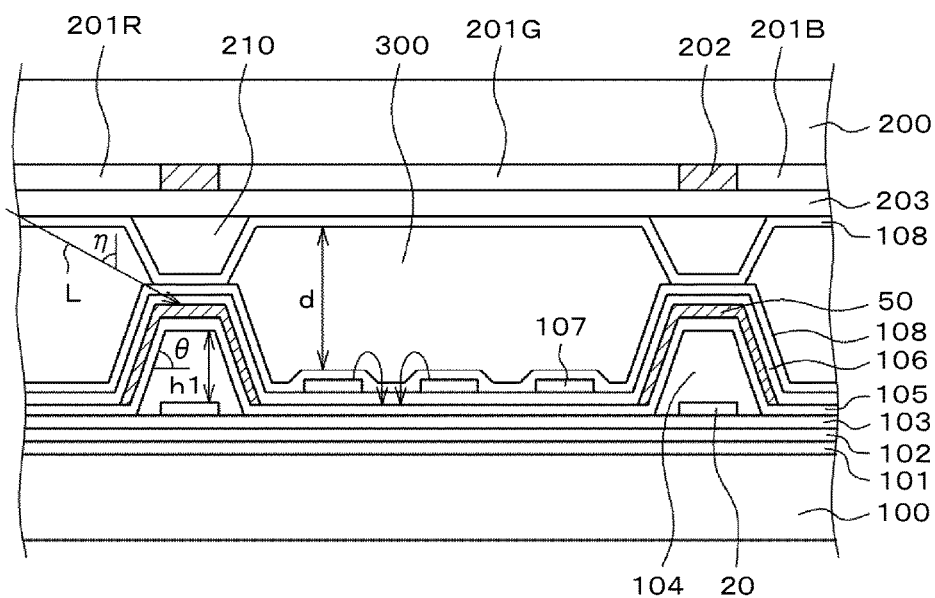
FIG. 11 is a cross sectional view taken along line C-C in FIG. 10.

FIG. 10 is a plan view of a pixel portion according to the embodiment, corresponding to FIG. 2 of the first embodiment. FIG. 10 is different from FIG. 2 in that the common electrode light shielding film 50 entirely covers the wall-shaped structure. FIG. 11 is a cross sectional view taken along line C-C in FIG. 10, corresponding to FIG. 3 of the first embodiment. FIG. 10 is different from FIG. 3 in that the common electrode light shielding film 50 covers the top surface and side surfaces of the wall-shaped structure.

Fifth Embodiment

The fifth embodiment has a structure similar to the structure of the second embodiment. However, in the configuration of the embodiment, the luminance of the screen can be improved more than that in the configuration of the second embodiment. In other words, the fifth embodiment is different from the second embodiment in that in the fifth embodiment, a common electrode light shielding film 50 is formed on the upper part as well as the side surfaces of a wall-shaped structure formed to cover a picture signal line 20. The common electrode light shielding film 50 is made of a metal, and thus has a large reflectance. Consequently, light can be reflected from the side surfaces of the wall to the front surface side of the display, allowing the use efficiency of light to be enhanced. Accordingly, the luminance of the screen can be improved. Similarly to the description in the second embodiment, also in this case, color mixture between adjacent pixels can be prevented.

Figure 12:
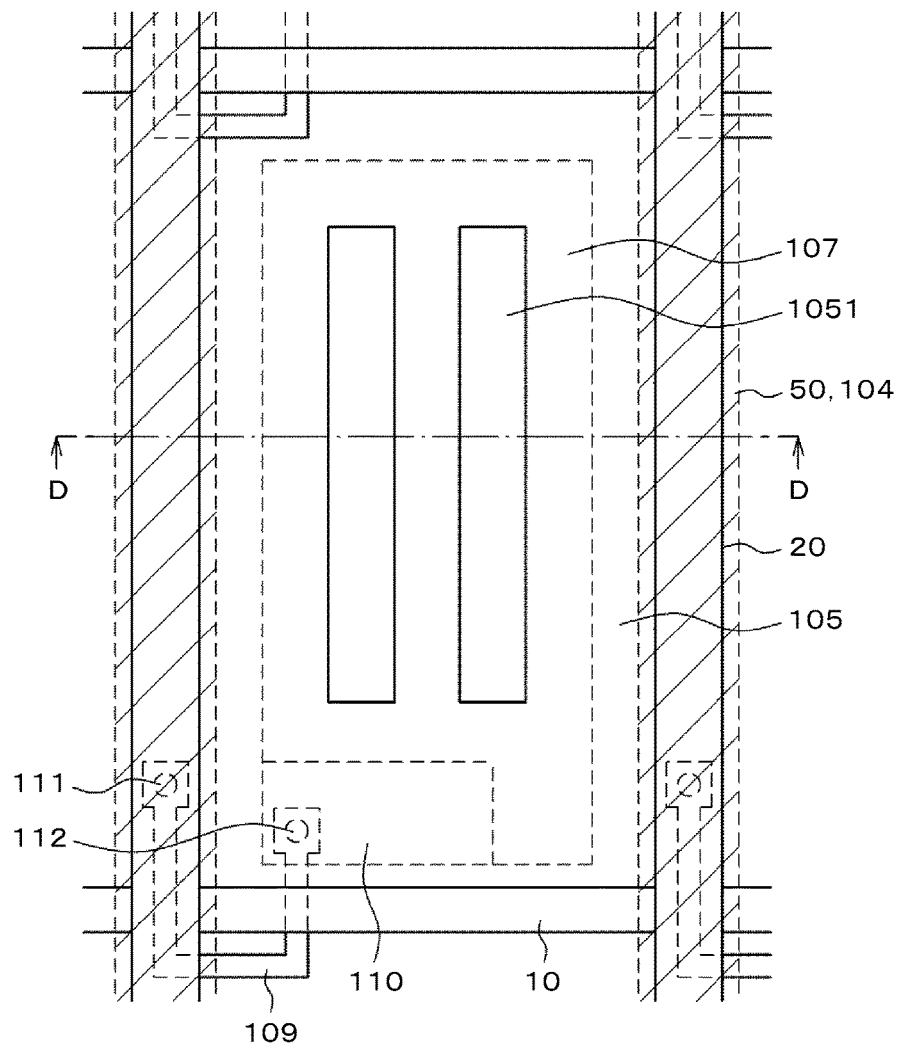
FIG. 12 is a plan view of a pixel portion according to a fifth embodiment.
Figure 13:
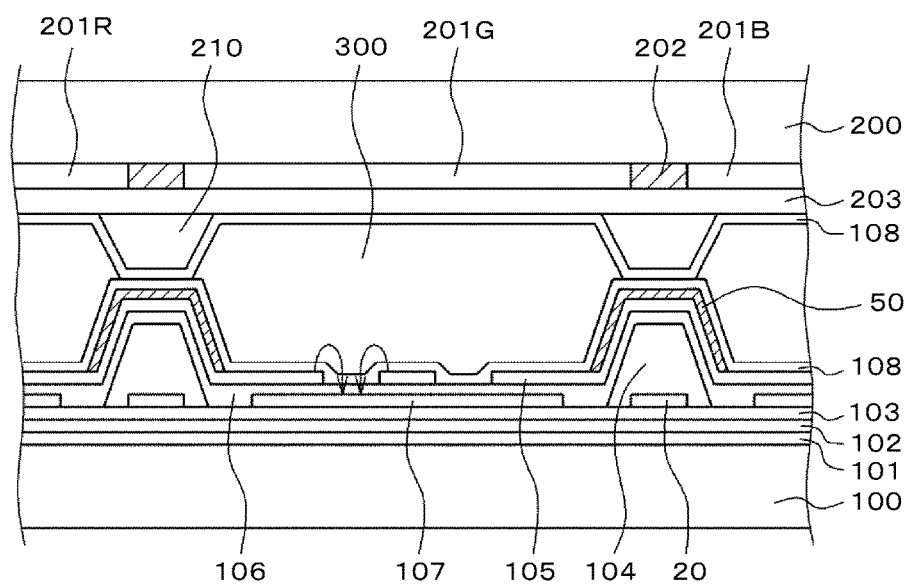
FIG. 13 is a cross sectional view taken along line D-D in FIG. 12.

FIG. 12 is a plan view of a pixel portion according to the embodiment, corresponding to FIG. 5 of the second embodiment. FIG. 12 is different from FIG. 5 in that the common electrode light shielding film 50 entirely covers the wall-shaped structure. FIG. 13 is a cross sectional view taken along line D-D in FIG. 12, corresponding to FIG. 6 of the second embodiment. FIG. 13 is different from FIG. 6 in that the common electrode light shielding film 50 covers the top surface and side surfaces of the wall-shaped structure.

Sixth Embodiment

A sixth embodiment has a structure similar to the structure of the third embodiment. However, in the configuration of the embodiment, the luminance of the screen can be improved more than that in the configuration of the third embodiment. In other words, the sixth embodiment is different from the third embodiment in that in the sixth embodiment, a common electrode light shielding film 50 covers the top surface and side surfaces of a wall-shaped structure formed to cover a picture signal line 20 and a scanning line 10. In the third embodiment, only the top surface of the wall-shaped structure covering the picture signal line 20 is covered. However, in the sixth embodiment, the common electrode light shielding film 50 is formed to cover the top surface and side surfaces of the wall-shaped structure covering the picture signal line 20 and the top surface and side surfaces of the wall-shaped structure covering the scanning line 10.

The common electrode light shielding film 50 is made of a metal, and thus has a large reflectance. Consequently, light can be reflected from the side surfaces of the wall to the front surface side of the display, allowing the use efficiency of light to be enhanced. Accordingly, the luminance of the screen can be improved. In the sixth embodiment, the luminance can be improved more than in the fourth and the fifth embodiments.

Figure 14:
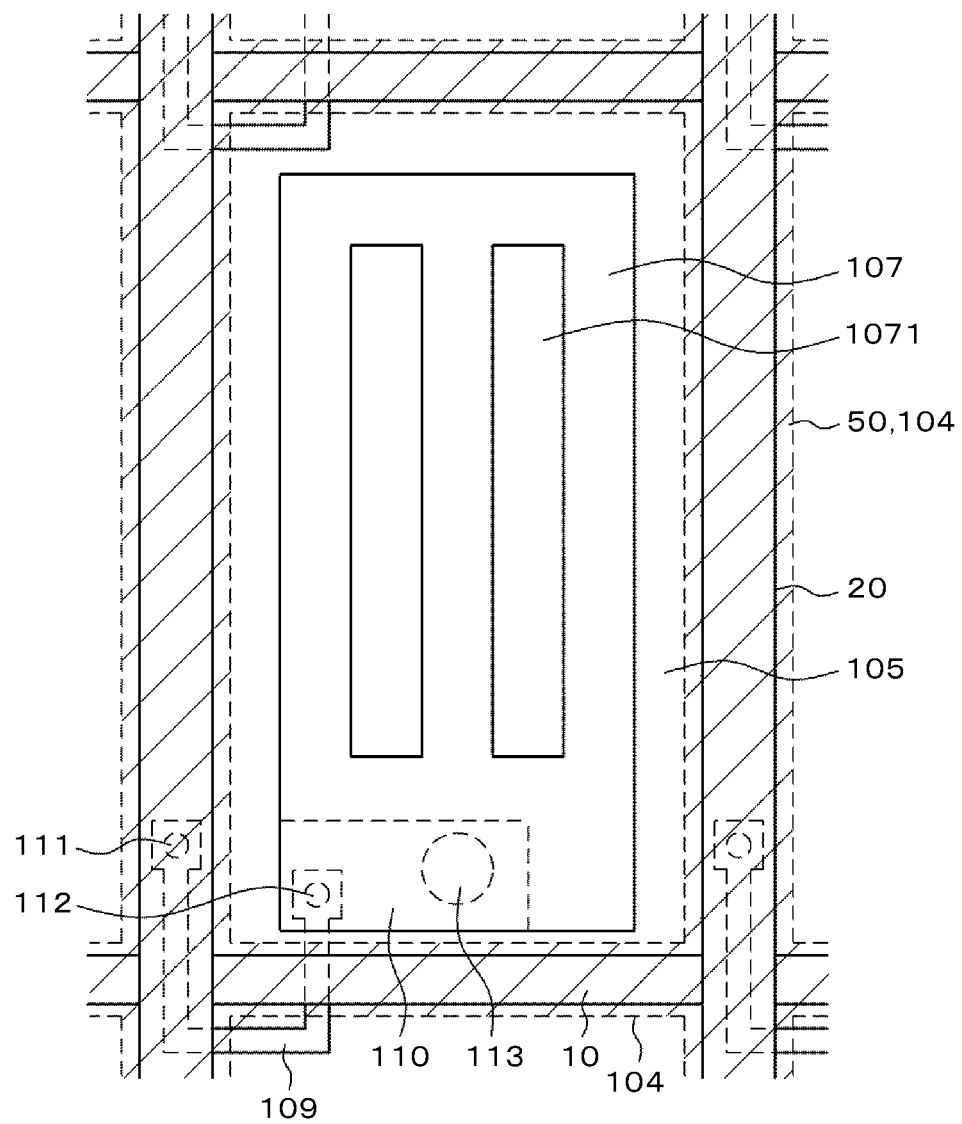
FIG. 14 is a plan view of a pixel portion according to a sixth embodiment.

FIG. 14 is a plan view of a pixel portion according to the embodiment, corresponding to FIG. 8 of the third embodiment. FIG. 14 is different from FIG. 8 in that the common electrode light shielding film 50 covers the top surface and side surfaces of the wall-shaped structure formed on the picture signal line 20 and the scanning line 10.

Note that, also in the fourth to the sixth embodiments, similar effects can be obtained by forming the common electrode light shielding film on the lower side of the common electrode.

What is claimed is:
1. A liquid crystal display device comprising:
a TFT substrate;
a counter substrate attached to the TFT substrate on an outer edge portion with a sealing material; and
a liquid crystal sealed between the TFT substrate and the counter substrate,
wherein: on the TFT substrate,
scanning lines extend in a first direction and are arrayed in a second direction at a first pitch,
a first insulating film is formed to cover the scanning lines,
on the first insulating film, picture signal lines extend in the second direction and are arrayed in the first direction at a second pitch, and
a pixel electrode is formed on a region surrounded by the scanning lines and the picture signal lines;
an organic insulating film is formed to cover the picture signal lines, and the organic insulating film is not formed below the pixel electrode;
a common electrode is formed to cover the organic insulating film and the first insulating film;
a second insulating film is formed to cover the common electrode, and the pixel electrode is formed on the second insulating film;

on the organic insulating film, a metal light shielding film is formed as extending in the second direction, and the metal light shielding film is in contact with the common electrode;
the organic insulating film has a wall-shaped structure; and
the metal light shielding film covers the wall-shaped structure along a top surface and a side surface of the wall-shaped structure.

2. The liquid crystal display device according to claim 1, wherein a gap between the TFT substrate and the counter substrate is defined by a spacer formed on the counter substrate as opposed to the organic insulating film formed in a wall shape.

3. The liquid crystal display device according to claim 1, wherein the metal light shielding film is formed on an upper side of the common electrode.

4. The liquid crystal display device according to claim 3, wherein the metal light shielding film has a three-layer structure; and
a resistivity of a center metal is lowest, and a lower metal is in contact with the common electrode.

5. The liquid crystal display device according to claim 1, wherein the metal light shielding film is formed on a lower side of the common electrode.

6. The liquid crystal display device according to claim 5, wherein: the metal light shielding film has a three-layer structure; and
a resistivity of a center metal is lowest, an upper metal is in contact with the common electrode, and a lower metal is in contact with the organic insulating film.

7. The liquid crystal display device according to claim 5, wherein the metal light shielding film has a two-layer structure; and
a resistivity of an upper metal is greater than a resistivity of a lower metal.

8. The liquid crystal display device according to claim 1, wherein the organic insulating film is formed to cover the scanning line.

9. A liquid crystal display device comprising:
a TFT substrate;
a counter substrate attached to the TFT substrate on an outer edge portion with a sealing material, and
a liquid crystal sealed between the TFT substrate and the counter substrate,
wherein: on the TFT substrate,
scanning lines extend in a first direction and are arrayed in a second direction at a first pitch,
a first insulating film is formed to cover the scanning lines,
on the first insulating film, picture signal lines extend in the second direction and are arrayed in the first direction at a second pitch, and
a pixel electrode is formed on a region surrounded by the scanning lines and the picture signal lines;
an organic insulating film is formed in a first film thickness in a direction perpendicular to a major surface of the TFT substrate to cover the picture signal line, the organic insulating film is formed in a second film thickness in the direction perpendicular to the major surface of the TFT substrate below the pixel electrode, and the first film thickness is larger than the second film thickness;
a common electrode is formed to cover the organic insulating film;

a second insulating film is formed to cover the common electrode, and the pixel electrode is formed on the second insulating film; and on the organic insulating film covering the picture signal line, a metal light shielding film is formed as extending in the second direction, and the metal light shielding film is in contact with the common electrode.

10. A liquid crystal display device comprising:
a TFT substrate;
a counter substrate attached to the TFT substrate on an outer edge portion with a sealing material; and
a liquid crystal sealed between the TFT substrate and the counter substrate,
wherein: on the TFT substrate,
  scanning lines extend in a first direction and are arrayed in a second direction at a first pitch,
  a first insulating film is formed to cover the scanning lines,
  on the first insulating film, picture signal lines extend in the second direction and are arrayed in the first direction at a second pitch, and
  a pixel electrode is formed on a region surrounded by the scanning lines and the picture signal lines;
an organic insulating film is formed to cover the picture signal lines, and the organic insulating film is not formed below the pixel electrode;
the pixel electrode is formed on the first insulating film;
a second insulating film is formed to cover the pixel electrode and the organic insulating film;
a common electrode is formed on the second insulating film;
the common electrode is formed on the pixel electrode and the organic insulating film,
on the organic insulating film, a metal light shielding film is formed to extend in the second direction, and the metal light shielding film is in contact with the common electrode;
the organic insulating film has a wall-shaped structure; and
the metal light shielding film covers the wall-shaped structure along a top surface and a side surface of the wall-shaped structure.

11. The liquid crystal display device according to claim 10, wherein a gap between the TFT substrate and the counter substrate is defined by a spacer formed on the counter substrate as opposed to the organic insulating film formed in a wall shape.

12. The liquid crystal display device according to claim 10, wherein the metal light shielding film is formed on an upper side of the common electrode.

13. The liquid crystal display device according to claim 10,
wherein the metal light shielding film has a three-layer structure, and
a resistivity of a center metal is lowest, and a lower metal is in contact with the common electrode.

14. The liquid crystal display device according to claim 10,
wherein the metal light shielding film is formed on a lower side of the common electrode.

15. The liquid crystal display device according to claim 14,
wherein the metal light shielding film has a three-layer structure, and
a resistivity of a center metal is lowest, an upper metal is in contact with the common electrode, and a lower metal is in contact with the organic insulating film.

16. The liquid crystal display device according to claim 14,
wherein the metal light shielding film has a two-layer structure, and
a resistivity of an upper metal is greater than a resistivity of a lower metal.

17. The liquid crystal display device according to claim 10, wherein the organic insulating film is formed to cover the scanning line.

* * * * *